(12) United States Patent
Yu et al.

(10) Patent No.: US 10,392,580 B1
(45) Date of Patent: Aug. 27, 2019

(54) SEED OIL BASED REACTIVE DILUENT

(71) Applicant: Rust-Oleum Corporation, Vernon Hills, IL (US)

(72) Inventors: Wumin Yu, Kenosha, WI (US); Zhigang Chen, Pleasant Prairie, WI (US)

(73) Assignee: Rust-Oleum Corporation, Vernon Hills, IL (US)

( * ) Notice: Subject to any disclaimer, the term of this patent is extended or adjusted under 35 U.S.C. 154(b) by 10 days.

(21) Appl. No.: 15/458,385

(22) Filed: Mar. 14, 2017

Related U.S. Application Data

(60) Provisional application No. 62/307,652, filed on Mar. 14, 2016.

(51) Int. Cl.
| | |
|---|---|
| *C11C 3/00* | (2006.01) |
| *C09D 15/00* | (2006.01) |
| *C09D 167/08* | (2006.01) |
| *B27K 5/02* | (2006.01) |
| *C09D 7/20* | (2018.01) |
| *C09D 7/61* | (2018.01) |
| *C08K 3/22* | (2006.01) |

(52) U.S. Cl.
CPC .................. *C11C 3/00* (2013.01); *B27K 5/02* (2013.01); *C09D 7/20* (2018.01); *C09D 7/61* (2018.01); *C09D 15/00* (2013.01); *C09D 167/08* (2013.01); *C08K 3/22* (2013.01); *C08K 2003/2265* (2013.01)

(58) Field of Classification Search
None
See application file for complete search history.

(56) References Cited

U.S. PATENT DOCUMENTS

| | | | |
|---|---|---|---|
| 2007/0241306 A1* | 10/2007 | Wehner | A61Q 5/02 252/67 |
| 2010/0249337 A1* | 9/2010 | Birukov | C08G 59/4014 525/408 |
| 2011/0060076 A1* | 3/2011 | Hefner, Jr. | C08G 59/28 523/400 |

OTHER PUBLICATIONS

Lindeboom, "Air-drying high solids alkyd pants for decorative coatings", Progress in Organic Coatings, 34 (1998) 147-151.
Hofland, "Alkyd resins: From down and out to alive and kicking", Progress in Organic Coatings, 73 (2012) 274-282.
Zabel et al., "Design and incorporation of reactive diluents for air-dying high solids alkyd paints", Progress in Organic Coatings, 35 (1999) 255-264.
Wutticharoenwong et al., "Synthesis of Tung-Oil-Based Reactive Diluents", Macromolecular Materials and Engineering, 295 (2010) 1097-1106.

(Continued)

*Primary Examiner* — Melvin C. Mayes
*Assistant Examiner* — Colette B Nguyen
(74) *Attorney, Agent, or Firm* — McDonnell Boehnen; Hulbert & Berghoff LLP

(57) ABSTRACT

A seed-oil based reactive diluent is synthesized via a two-step process wherein in the first step, unsaturated seed oils such as soybean oil first react with mono-hydroxy functional amines to form an intermediate mixture composed of mono-hydroxy functional seed oil based derivatives and in the second step, a core molecule having multiple hydroxyl-reactive groups reacts with the intermediate mixture prepared from the first step and a polyol cross-linker to form a reactive diluent with a star-branched shape.

25 Claims, 4 Drawing Sheets

(56) References Cited

OTHER PUBLICATIONS

Wutticharoenwong et al., "Tung based reactive diluents for alkyd systems: Film properties", Progress in Organic Coatings, 73 (2012) 283-290.
Nalawade et al., "Modified Soybean Oil as a Reactive Diluent: Synthesis and Characterization", Journal of Polymer Science, Part A: Polymer Chemistry, 52, (2014) 3045-3059.
Ohlsson et al., "Novel coil coating systems using fatty acid based reactive diluents", Progress in Organic Coatings, 73 (2012) 291-293.
Rogers et al., "Novel "Green" Sucrose Polyester Alkyds for High-Performing Low VOC Coatings", JCT Coatings Tech, Jun. 1, 2010.
Alidedeoglu et al., "Synthesis and evaluation of tetra(2,7-octadienyl) titanate as a reactive diluent for air-drying alkyd paints", Journal of Coatings Technology and Research, 8, (2011) 45-52.
Rawlins et al., "Synthesis and Characterization of Soyamide Ferulate", J Am Oil Chem Soc, 85, (2008) 783-789.
Karakaya et al., "Synthesis of oil based hyperbranched resins and their modification with melamine-formaldehyde resin", Progress in Organic Coatings, 59 (2007) 265-273.
Pramanik et al., "Bio-degradable vegetable oil based hyperbranched poly(ester amide) as an advanced surface coating material", Progress in Organic Coatings, 76 (2013) 689-697.
Bhabhe et al., "Chemoenzymatic synthesis of oil-modified acrylic monomers as reactive diluents for high solids coatings", Progress in Organic Coatings, 30 (1997) 207-211.

* cited by examiner

SEED OIL BASED REACTIVE DILUENT

This application claims priority to U.S. Provisional Patent Application Ser. No. 62/307,652, filed Mar. 14, 2016 the specification of which is incorporated herein by reference.

BACKGROUND OF THE INVENTION

(1) Field of the Invention

This invention concerns methods for synthesizing a seed-oil based reactive diluent by a two-step process wherein the seed-oil based reactive diluent product is a star-branched shape.

(2) Description of the Art

Alkyd resins have been used as coating binders in the paint and coatings industry since 1930s. Due to their cost, efficiency, versatility, excellent adhesion and good gloss retention and corrosion resistance, alkyd resins have been used in many solvent-based coating systems. However, solvent-based alkyd coatings contribute to volatile organic compound (VOC) emissions, which can have adverse effects on human health and on the environment. With increasingly stringent VOC regulations, paint and coatings manufacturers face ever-greater pressure to reduce the VOC content in solvent-based coatings.

A common approach to lowering VOC content in solvent-based alkyd coatings is to use exempt solvents, such as acetone, methyl acetate, parachlorobenzotrifluoride (PCBTF), octamethylcyclotetrasiloxane (D4 cyclic siloxane) and tert-butyl acetate. However, using exempt solvents to replace conventional solvents in alkyds is limited by the selected exempt solvent odor, cost and flammability. Another common method to lower VOC's is to develop high-solid coatings. Although some high solid alkyd resins with solid contents higher than 85 wt % have been developed by methods such as lowering their molecular weights, narrowing their molecular weight distribution, reducing the number of polar groups, and/or lowering their glass transition temperatures, performance parameters for these resins has degraded resulting in resins with longer drying times and softer films.

Solvent-based alkyd coatings in particular have been losing their market share to other competing technologies such as waterborne coatings, powder coatings and UV-curable coatings due to their high VOC content. To regain market share it is desirable to develop new and improved solvent based alkyd coatings with low VOC levels to meet stricter VOC requirements and, and at the same time remain low cost and exhibit outstanding performance.

SUMMARY OF THE INVENTION

One appealing way to achieve high solid alkyd coatings is using reactive diluents. Reactive diluents not only can serve as solvents to lower the viscosity of the formulation but also can be converted into an integral part of the coating film by participating in the coating oxidative crosslinking curing process. An useful reactive diluent may have one or more of the following features: low viscosity, low volatility, light color, good storage stability, no influence on drying times with comparable curing speed to alkyd resins, no toxic degradation products, no influence on film hardness, good through-drying, no influence on gloss and durability, etc., and is an economic replacement for regular solvents.

The reactive diluents of this invention are prepared from seed oils, not only for sustainability and environment considerations, but also because many seed oils have intrinsic carbon-carbon double bonds that can undergo oxidative curing and are compatible with alkyd resins. However, it can be difficult to obtain reactive diluents that perform well in solvent-based alkyd coatings by using unmodified seed oils due to the low curing rate of seed oils. Although extensive research has been conducted to modify seed oils to improve their performance as reactive diluents for alkyd systems, the cost increase associated with using more expensive drying oils, such as linseed oil and tung oil as the raw materials, the involvement of multistep processes including the necessity of separation and purification, and the introduction of new issues such as storage stability and possible generation of toxic byproducts from decomposition hinder their commercial success.

Therefore, an aspect of this invention is method of synthesizing seed oil-based reactive diluents that can lower the VOC content of solvent-based air-drying alkyd wood stains with little impact to the stain performance. The seed oil-based reactive diluents of this invention are synthesized via a two-step process. Seed oil such as soybean oil is first converted to a mixture of mono-hydroxy functional soy derivatives, including fatty acid amides and diglycerides. The reactive diluent is then formed by reacting the soy derivatives and a polyol crosslinker with a core molecule having multiple hydroxyl-reactive groups. The star-branched structure of the reactive diluent allows the reactive diluent to bear a large number of unsaturated fatty acid chains in each molecule to increase the reactive sites without significantly increasing its viscosity.

Another aspect of this invention is a method for synthesizing a seed-oil based reactive diluent that comprises the steps of: reacting an unsaturated seed oil with a mono-hydroxy functional amine in an aminolysis reaction for a period of time and at a temperature sufficient to form an intermediate reaction mixture of mono-hydroxy functional seed oil derivatives; and reacting a core molecule with the intermediate reaction mixture and a polyol crosslinker to form a reactive diluent.

Still another aspect of this invention is the seed oil-based reactive diluents can be used to significantly reduce the VOC content of solvent based air-drying alkyd wood stains without increasing the cost and reducing the performance of the stains. The said reactive diluent also helps reduce the need for wetting and dispersing agents and rheology modifiers in the stain formulations. In addition, the said reactive diluent is also an effective grinding and dispersing medium for inorganic pigments so that zero VOC tinting pastes for solvent-borne air-drying alkyd wood stains can be prepared.

Yet another aspect of this invention is a reactive diluent comprising the reaction product of mono-hydroxy functional seed oil derivatives, core molecules and polyols wherein each reactive diluent molecule has n fatty acid side chains wherein n is an integer of from 4 to 15.

DETAILED DESCRIPTION

This invention concerns methods for synthesizing a seed-oil based reactive diluent by reacting an unsaturated seed oils such as soybean oil with mono-hydroxy functional amines to form an intermediate mixture composed of mono-hydroxy functional seed oil based derivatives, including fatty acid amides and diglycerides. In the second step, a core molecule having multiple hydroxyl-reactive groups reacts with the intermediate mixture prepared from the first step and a polyol crosslinker to form a reactive diluent with a star-branched shape. The said reactive diluent can be used to significantly reduce the volatile organic compound (VOC) content in solvent-borne air-drying alkyd wood stains without affecting their drying performance. The needs for wetting and dispersing agents and rheology modifiers also can be reduced or even eliminated by incorporating the said reactive diluent in the stain formulations. In addition, the said reactive diluent is also an effective grinding and dispersing medium for inorganic pigments so that zero VOC tinting pastes can be prepared.

Figure 1:
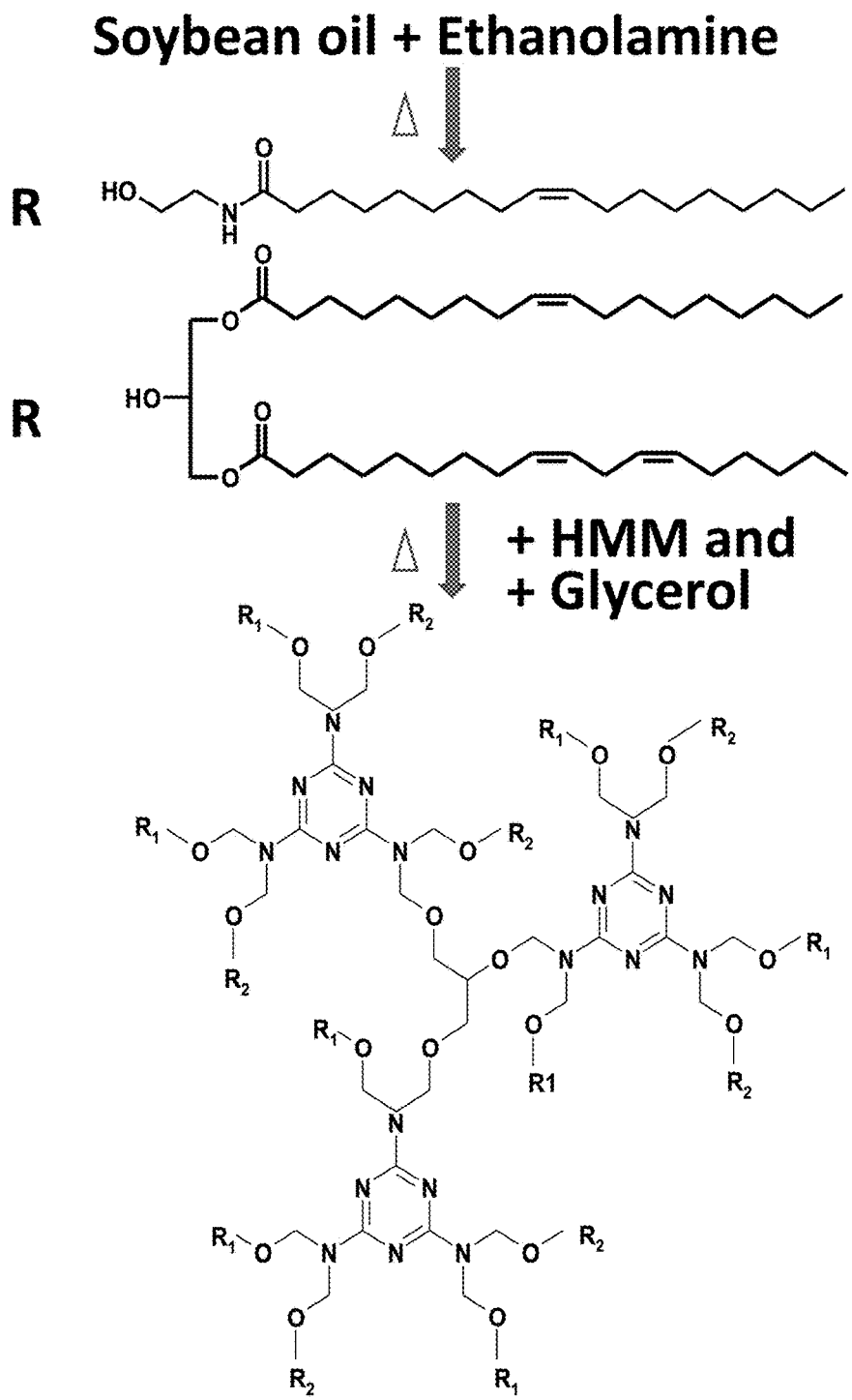
FIG. 1 is an illustration of a possible reaction route to seed oil-based reactive diluents using soybean oil and ethanolamine.

An aspect of this invention are methods of preparing seed oil-based reactive diluent. The method includes at least two steps, as illustrated in FIG. 1. Triglycerides are predominant components of seed oils. Each triglyceride molecule has only three fatty acid chains. In the first method step, a seed oil ingredient is converted into a mixture of mono-hydroxy functional seed oil derivatives. This conversion can be achieved through an aminolysis reaction between a seed oil triglyceride molecule and one or more mono-hydroxy functional amines such as ethanolamine. In this first method step, the molar ratio of mono-hydroxy functional amine to the seed oil triglyceride molecule can vary from 0.5:1.0 to 1.0:0.5 and is preferably maintained at about 1:1 in the aminolysis reaction so that one triglyceride molecule is converted into an intermediate product including one fatty acid amide ($R_1$) molecule and one diglyceride ($R_2$) molecule, both of which have only one hydroxyl group. In the first method step, the reaction temperature is preferably maintained in the range of 60 to 150° C.

The first method step reaction may be conducted with or without any catalyst. Catalysts useful in the aminolysis of seed oils include, but are not limited to strong bases such as sodium methoxide. Any aminolysis catalyst that is effective on a seed oil feed may be used. The aminolysis reaction can be conducted without any catalyst in which case no catalyst removal step is required following aminolysis.

The seed oils useful as a reactant in the first method step include any unsaturated plant-based oils including but not limited to soybean oil, canola oil, tall oil, safflower oil, linseed oil, corn oil, sunflower oil, olive oil, sesame oil, cottonseed oil, rapeseed oil, tung oil, peanut oil, jatropha oil and any combinations thereof.

The one or more mono-hydroxy functional amines useful as a reactant in the first method step include amines having one hydroxyl group and at least one primary or secondary amine group, including but not limited to ethanolamine, 2-(methylamino)ethanol, 1-amino-2-propanol, DL-alaninol, 3-amino-1-propanol, 5-amino-2,2-dimethylpentanol, 2-(ethylamino)ethanol, 2-amino-1-butanol, 2-amino-2-methyl-1-propanol, 3-methylamino-1-propanol and 4-amino-1-butanol and any combinations thereof.

As noted above, the first method step reaction produces an intermediate product including one fatty acid amide ($R_1$) molecule and one diglyceride ($R_2$) molecule. In the second method step, the mono-hydroxy functional seed oil intermediate product derivatives are combined with a core molecule bearing multiple hydroxyl-reactive groups as well as a polyol as a crosslinker and allowed to react to form a reactive diluent with a star-branched shape. The core molecule bearing multiple hydroxyl-reactive groups is a molecule having at least two hydroxyl-reactive groups which can react with the hydroxyl groups in the seed oil derivatives from the first step to form chemical bonds. Suitable core molecules include but are not limited to melamines such as hexamethylolmelamine (HMM) and hexakis(methoxymethyl)melamine (HMMM), polyisocyanates such as hexamethylene diisocyanate, trimer of hexamethylene diisocyanate and trimer of isophorone diisocyanate, polyacids such as terephthalic acid and trimesic acid, anhydrides such as maleic anhydride and phthalic anhydride.

The polyol ingredient is any molecule with at least two hydroxyl groups. Suitable polyols include but are not limited to ethylene glycerol, glycerol and pentaerythitol. The polyols serve as cross-linkers and increase the branching of the reactive diluent thereby increase the number of unsaturated fatty acid chains in one reactive diluent molecule to more than 3 fatty acid side chains.

Figure 5:
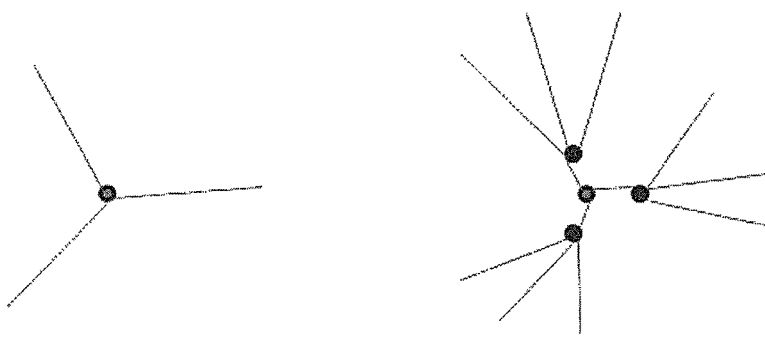
FIG. 5 is a schematic of a seed oil triglyceride molecule having three fatty acid side chains and a schematic of the reactive diluent of this invention having a star-branched shape including more than three and up to fifteen fatty acid side chains.

As shown in FIGS. 1 and 5, a reactive diluent if this invention, comprising the reaction product of mono-hydroxy functional seed oil derivatives, core molecules and polyols has a star branched shape that includes n fatty acid side chains wherein n is an integer of from 4 to 15. The reactive diluent of this invention will typically include a combination of reactive molecules having different numbers (n) of fatty acid side chains. Generally the combination of reactive diluent molecules will together have an average number of fatty acid side chains that ranges from about 5 to about 14. In addition, the reactive diluent molecules can have a number average molecular weight ranging from about 900 to 1400 and a weight average molecular weight ranging from about 3000 to 4500.

Example 1. Synthesis of Seed Oil-Based Reactive Diluent Based on Soybean Oil, Ethanolamine, Glycerol and HMM

| Component | Amount (grams) |
|---|---|
| Soybean oil | 1200.00 |
| Ethanolamine | 83.86 |
| Glycerol | 14.63 |
| HMM | 162.16 |
| Cycat 4040 (alkyl benzene sulfonic acid catalyst) | 10.95 |
| Ethanol | 162.16 |

This example used the ingredients and amounts listed above. In this example, the soybean oil and ethanolamine were combined into a 2000 mL three-neck round bottom flask reactor equipped with nitrogen inlet, temperature controller, reflux condenser and magnetic stirrer. The mixture was heated to 130° C. and stirred for 5 hours. The reaction was monitored with Fourier Transform Infrared Spectroscopy (FTIR), amine value titration and hydroxyl value titration. The amine value of the reaction mixture dropped to 1.6 after 5 hours of reaction at 130° C. The hydroxyl number was measured to be about 115 from hydroxyl value titration and there was no obvious change in the hydroxyl number after 5 hours of reaction at 130° C. The reaction mixture was then purged with nitrogen for one hour to remove any residual ethanolamine from the reaction mixture. The amine value further dropped to 0.1 after the nitrogen purging process.

Figure 2:
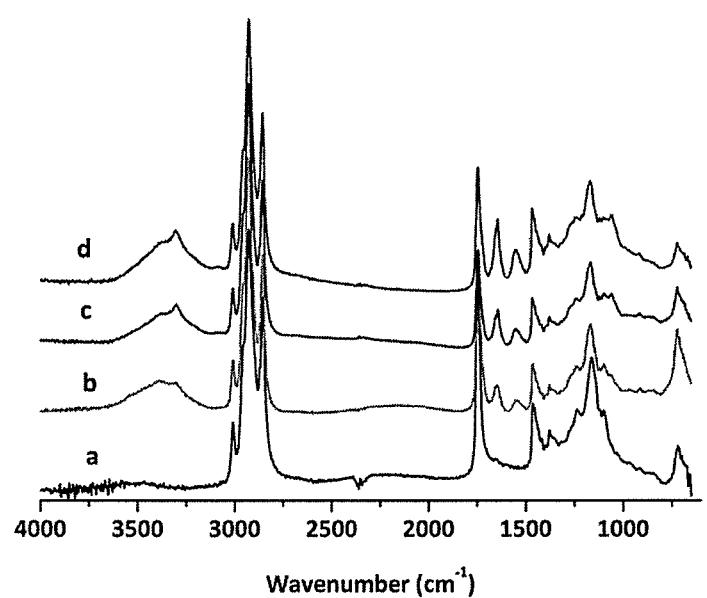
FIG. 2 is an FTIR spectra of the reaction of Example 1 including (a) soybean oil and reaction product of soybean oil and ethanolamine at different reaction times: (b) 1 hours, (c) 2 hours and (d) 3 hours.

FIG. 2 shows the FTIR spectra of soybean oil and reaction product of soybean oil and ethanolamine at different reaction times in the first step. The appearance of the —OH band at 3300-3400 $cm^{-1}$ and carbonyl amide band at 1640 $cm^{-1}$ and diminishing of the carbonyl ester band at 1740 $cm^{-1}$ confirmed the formation of fatty acid ethanolamide.

Figure 3:
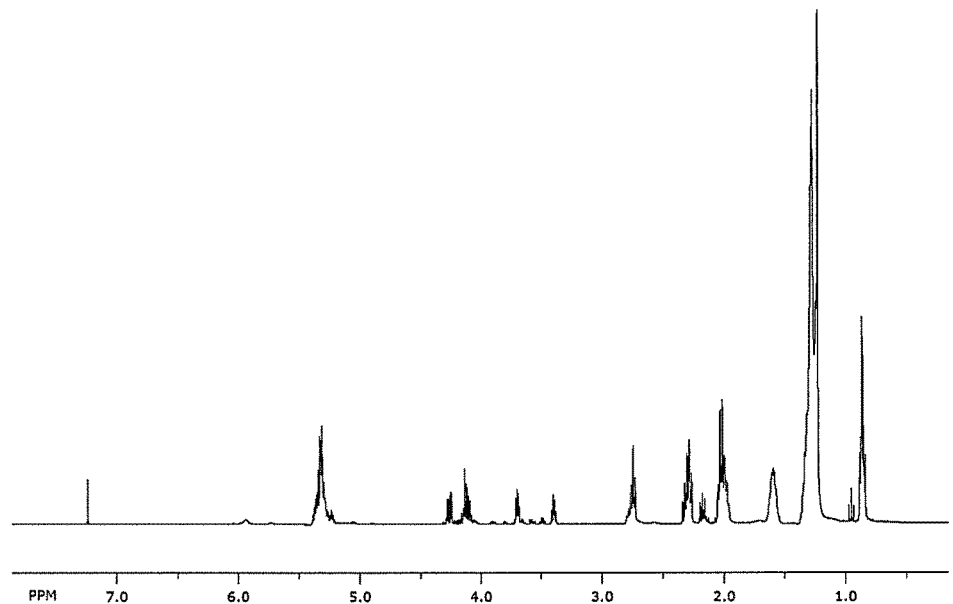
FIG. 3 is a $^1$H NMR spectra of the reaction product of Example 1 between soybean oil and ethanolamine.

The $^1H$ NMR spectral data of the reaction product—shown in FIG. 3—between soybean oil and ethanolamine confirmed the formation of fatty acid ethanolamide: δ 0.86 (—$CH_3$), 0.95 (—$CH_3$ of n-3 polyunsaturated fatty acids), 1.25 (—$CH_2$—), 1.59 (—$CH_2$—$CH_2$—COO—), 2.01 (—$CH_2$—CH=CH—$CH_2$—), 2.17 (—$CH_2$—CO—NH—), 2.30 (—$CH_2$—COO—), 2.74 (—CH=CH—$CH_2$—CH=CH—), 3.40 (—NH—$CH_2$—$CH_2$—OH), 3.69 (—NH—$CH_2$—$CH_2$—OH), 4.13 and 4.27 (—O—CH2-CH(—O—)—CH2-O—), 5.24 (—O—CH2-CH(—O—)—CH2-O—), 5.32 (—CH=CH—), 5.94 (CO—NH—).

Next, a HMM solution was prepared by pre-dissolving the HMM in the ethanol in the presence of one third of the above amount of Cycat 4040 and then stirring at 75° C. for 1 to 3 hours. To the HMM solution was added the above amount of glycerol and the remainder of the Cycat 4040. The admixture was mixed with the reaction product of the soybean oil and ethanolamine to form a second reaction mixture. The second reaction mixture was stirred for 3 hours at 120° C. and then cooled to room temperature. The final product was a slightly hazy liquid with a viscosity of 430 cp at room temperature.

Figure 4:
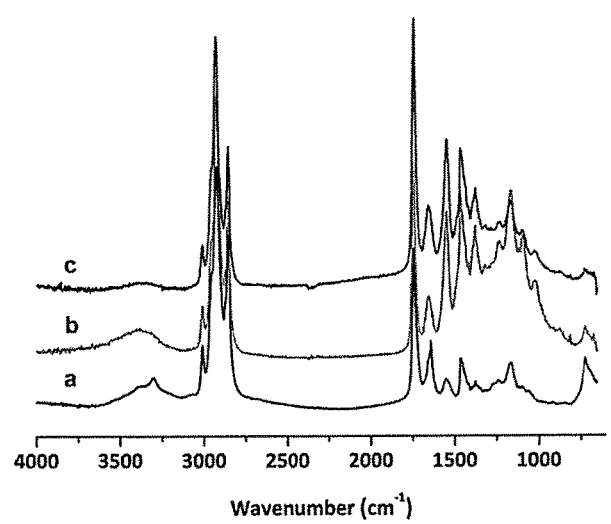
FIG. 4 is an FTIR spectra of the reaction mixture of Example 1 during the second reaction step at different reaction times: (a) 0 hours, (b) 1 hour and (c) 2 hours.

The conversion of the reaction in the second step to obtain the final product was monitored with FTIR. As shown in FIG. 4, the gradual diminishing of the —OH band at 3300-3400 $cm^{-1}$ with increasing reaction time confirmed the gradual conversion and completion of the reaction. The disappearance of the —OH peak at 3300-3400 $cm^{-1}$ in FIG. 4 (c) indicates that the second step reaction could be finished in about two hours.

The molecular weight of final product in Example 1 determined by gel permeation chromatography (GPC) using monodisperse polystyrene standards is as follows:

| $M_n$ (Daltons) | $M_w$ (Daltons) | Polydispersity |
| --- | --- | --- |
| 1065 | 3388 | 3.18 |

Example 2. Performance Evaluation of Reactive Diluent from Example 1 in Low VOC Wood Stain Formulation Three wood stains were formulated based on the recipes listed in Table 1 for performance tests. A commercial fast drying soya alkyd with a solid content of 55 wt % in mineral spirits was used both in the 250 g/L VOC soy reactive diluent based stain (soy formula) and the 550 g/L VOC control formula (control A). The 250 g/L VOC control formula (control B) was formulated with a commercial 100 wt % solid alkyd. Stain drying performance was evaluated by the following procedure. First, one coat of stain was applied to a designated area on a wood panel with a clean lint-free rag. The stain was allowed to penetrate for five minutes, after which excess stain was removed by wiping with a clean rag. The stain was allowed to dry at room temperature for one hour. Then a clear solvent-borne urethane topcoat was applied with a brush. The drying performance of the stain was evaluated by examining the bleaching of the pigments in the stain layer from the stained area to the unstained area on the wood panel. Stain penetration evaluation was performed by first placing a drop of wood stain on a wood panel. After in contact for 30 minutes, excess stain was removed with a clean rag and the stain contacted area was examined. All the performance tests were rated on a five points scale (1=poor, 2=fair, 3=good, 4=very good, 5=excellent). Hot-box stability test was conducted at 50° C. and 50% relative humidity for two months.

TABLE 1

Alkyd formulations for performance tests

| Composition | Soy formula 250 VOC | Control A 550 VOC | Control B 250 VOC |
| --- | --- | --- | --- |
| Fast-drying alkyd | 20 | 20 | 0 |
| 100 wt % solid alkyd | 0 | 7.8 | 46 |
| Soy reactive diluent | 38 | 0 | 0 |
| Additional solvent (mineral spirits) | 4.5 | 34.8 | 15.5 |
| Rheology additive | 0 | 0.6 | 0 |
| Dryers | 1.5 | 0.8 | 1.5 |
| Tinting paste | 36 | 36 | 36 |
| Total | 100 | 100 | 100 |

The performance of the soy reactive diluent based stain and the control stains in terms of drying performance, hot-box stability and pigment penetration is listed in Table 2. The drying performance of the three stains was evaluated by examining the bleaching of the stains when a topcoat was applied after the stains had been dried for a certain time. The left and middle coated panels in FIG. 5 correspond to the 250 VOC soy reactive diluent modified stain and the original 550 VOC stain respectively. The negligible pigment bleaching on these two panels indicate that both the stains can dry in one hour at room temperature. The results demonstrate that the incorporation of the soy reactive diluent at more than 30 wt % of the total formula did not affect the drying performance of the stain. In comparison, the 250 VOC formula based on a 100 wt % solid alkyd showed inferior drying performance and there was still significant bleaching of pigments even after three hours of drying when a top coat was applied.

In the stain penetration evaluation between the 250 VOC soy formula and the 550 VOC control formula the soy formula not only showed better stain penetration with deeper color but also displayed better wetting and spreading even though there was no additional wetting and dispersing agent incorporated in the soy formula. All the tested stains showed comparable hot-box stability with soft settling of pigments after two months in hot box.

TABLE 2

Performance comparison of the three wood stains

| Performance | Soy formula 250 VOC | Control A 550 VOC | Control B 250 VOC |
|---|---|---|---|
| Fast drying | 5 | 5 | 3 |
| Pigment penetration | 5 | 4 | — |
| Hot-box stability | 4 | 4 | 4 |

Example 3. Preparation of Pigment Dispersions as Tinting Pastes

The seed oil-based reactive diluent was also used to grind inorganic pigments to evaluate its ability to function as a medium in preparing tinting pastes. Two tinting pastes were prepared and evaluated based on the recipes in Table 3. The old tinting paste formula based on a high solid alkyd resin was prepared using a horizontal mill. The new tinting paste based on the soy reactive diluent of Example 1 was prepared using a high speed disperser. An iron oxide pigment from Hoover Color (Burnt Siennas 320BS) was used in preparing the tinting pastes. All pigments were ground to a Hegman 7+ grind.

TABLE 3

Recipes for the tinting pastes

| Composition | Old tinting paste | New tinting paste |
|---|---|---|
| High solid alkyd resin | 26 | — |
| Soy reactive diluent | — | 41 |
| Additional solvent (mineral spirits) | 12 | 0 |
| Rheology additive | 1.7 | 0 |
| Wetting and dispersing agent | 1.3 | 0 |
| Burnt Siennas 320BS iron oxide | 59 | 59 |
| Total | 100 | 100 |

The performance comparison of the two tinting pastes is summarized in Table 4. The old tinting paste based on a high solid alkyd was prepared by a horizontal mill and has 187 g/liter VOC. Compared with the old tinting paste, the new tinting paste was prepared using a high speed disperser with only two components, the reactive diluent and the pigment. Although both the tinting pastes have the same pigment loading and a Hegman gauge reading over 7, the new tinting paste displayed higher color strength. The new tinting paste also showed comparable hot-box stability despite formulation omitting a wetting agent, a dispersing agent and a rheology additive. Since the new tinting paste is zero VOC, it could help further lower the VOC level and provide more flexibility to the stain formulation.

TABLE 4

Performance comparison of the two tinting pastes

| Performance | Old tinting paste | New tinting paste |
|---|---|---|
| VOC (g/liter) | 187 | 0 |
| Hegman reading | >7 | >7 |
| Color strength | 4 | 5 |
| Hot-box stability | 4 | 4 |

Example 4. Synthesis of Seed Oil-Based Reactive Diluent Based on Soybean Oil, 2-(Methylamino)Ethanol, Glycerol and HMM

| Component | Amount (grams) |
|---|---|
| Soybean oil | 1200.00 |
| 2-(methylamino)ethanol | 123.75 |
| Glycerol | 19.71 |
| HMM | 218.46 |
| Cycat 4040 (catalyst) | 11.71 |
| Ethanol | 218.46 |

In this example, the soybean oil was added to a 3000 mL four-neck round bottom flask reactor equipped with nitrogen inlet, temperature controller, reflux condenser, addition funnel, and magnetic stirrer. The soybean oil was heated to 130° C. in the reactor after which the above amount of 2-(methylamino)ethanol was added into the reactor dropwise through the addition funnel. Next mixture was stirred at 130° C. for 9 hours. The amine value was 1.43 after 9 hours of reaction at 130° C. The reaction mixture was then purged with nitrogen for one hour to remove the residual 2-(methylamino)ethanol. The amine value was 0.4 after the nitrogen purging process. The hydroxyl number was measured to be 120.

Next a HMM solution was prepared by pre-dissolving the HMM in the above amount of ethanol in the presence of one third of the above amount of Cycat 4040. The mixture was then stirred at 75° C. for 1 to 3 hours. The HMM solution was next combined with the above amount of glycerol and the remainder of the Cycat 4040 and then combined with the product of the reaction between the soybean oil and the ethanolamine. The reaction mixture was stirred for 3 hours at 120° C. and then cooled to room temperature. The final reaction product was a clear liquid with a viscosity of 405 cp.

The performance of the reactive diluent in a low VOC stain formula and when acting as pigment dispersing medium was evaluated according to Examples 2 and 3. The reactive diluent from this example performed similarly as the reactive diluent from Example 1.

The molecular weight of final product in Example 4 determined by gel permeation chromatography (GPC) using monodisperse polystyrene standards is as follows:

| $M_n$ (Daltons) | $M_w$ (Daltons) | Polydispersity |
|---|---|---|
| 997 | 4178 | 4.19 |

Example 5. Synthesis of Seed Oil-Based Reactive Diluent Based on Soybean Oil, Ethanolamine, Glycerol and HMMM

| Component | Amount (grams) |
|---|---|
| Soybean oil | 500.00 |
| Ethanolamine | 34.94 |
| Glycerol | 7.62 |
| HMMM (Cymel 303 LF) | 108.92 |
| Cycat 4040 (catalyst) | 4.89 |

This example used the ingredients and amounts listed above. In this example, the above amounts of soybean oil and ethanolamine were combined in a 1000 mL three-neck round bottom flask reactor equipped with nitrogen inlet, a temperature controller, reflux condenser and magnetic stirrer. The mixture was heated to 130° C. and stirred for 5 hours. The amine value of the reaction product was 1.6. The reaction mixture was then purged with nitrogen for one hour to remove the residual ethanolamine. The amine value was 0.1 following the nitrogen purge. The hydroxyl number was measured to be 115.

Next, the reaction temperature was lowered to 120° C. and the above amounts of HMMM (Cymel 303LF from Allnex), glycerol and catalyst (Cycat 4040 from Allnex) were added to the reactor. The mixture was stirred for 3 hours at 120° C. and then cooled to room temperature to give a clear liquid with a viscosity of 674 cp.

The performance of the reactive diluent in low VOC stain formula and when acting as pigment dispersing medium was evaluated according to Examples 2 and 3. The reactive diluent from this Example performed similarly as the reactive diluent from Example 1.

The molecular weight of final product in Example 5 determined by gel permeation chromatography (GPC) using monodisperse polystyrene standards is as follows:

| $M_n$ (Daltons) | $M_w$ (Daltons) | Polydispersity |
|---|---|---|
| 1247 | 3835 | 3.08 |

Having described the invention in detail and by reference to specific embodiments thereof, it will be apparent that modifications and variations are possible without departing from the scope of the invention defined in the appended claims. More specifically, although some aspects of the present invention are identified herein as particularly advantageous, it is contemplated that the present invention is not necessarily limited to these particular aspects of the invention.

What is claimed is:

1. A seed-oil based reactive diluent prepared by a method comprising the steps of:
    (a) reacting an unsaturated seed oil with a mono-hydroxy functional amine in an aminolysis reaction for a period of time and at a temperature sufficient to form an intermediate reaction mixture of mono-hydroxy functional seed oil derivatives; and
    (b) reacting a core molecule bearing multiple hydroxyl-reactive groups and a polyol with the intermediate reaction mixture to form a reactive diluent,
    wherein the reactive diluent is reaction product of the mono-hydroxy functional seed oil derivatives, the core molecule, and the polyol, the reactive diluent having a star-branched shape.

2. The seed-oil based reactive diluent of claim 1, wherein the unsaturated seed oil is an unsaturated plant-based oil.

3. The seed-oil based reactive diluent of claim 1 wherein the unsaturated seed oil is on or more of soybean oil, canola oil, tall oil, safflower oil, linseed oil, corn oil, sunflower oil, olive oil, sesame oil, cottonseed oil, rapeseed oil, tung oil, peanut oil, jatropha oil and combinations thereof.

4. The seed-oil based reactive diluent of claim 1, wherein the mono-hydroxy functional amine is one or more amine having one hydroxyl group and one primary or secondary amine group.

5. The seed-oil based reactive diluent of claim 1 wherein the mono-hydroxy functional amine is one or more of ethanolamine, 2-(methylamino)ethanol, 1-amino-2-propanol, DL-alaninol, 3-amino-1-propanol, 5-amino-2,2-dimethylpentanol, 2-(ethylamino)ethanol, 2-amino-1-butanol, 2-amino-2-methyl-1-propanol, 3-methylamino-1-propanol and 4-amino-1-butanol or combinations thereof.

6. The seed-oil based reactive diluent of claim 1 wherein the reaction temperature between the seed oil and the mono-hydroxy functional amine in step (a) ranges from about 60 to about 150° C.

7. The seed-oil based reactive diluent of claim 1, wherein the aminolysis reaction is conducted without a catalyst.

8. The seed-oil based reactive diluent of claim 1, wherein the reaction temperature in step (b) ranges from about 60 to about 180° C.

9. The seed-oil based reactive diluent of claim 1, wherein the core molecule bearing multiple hydroxyl-reactive groups is a molecule having at least two hydroxyl-reactive groups which are capable of reacting with hydroxyl groups of the mono-hydroxy functional seed oil derivatives to form chemical bonds.

10. The seed-oil based reactive diluent of claim 1, wherein the core molecule bearing multiple hydroxyl-reactive groups is one or more of melamines, polyisocyanates, polyacids and anhydrides.

11. The seed-oil based reactive diluent of claim 10, wherein the core molecule bearing multiple hydroxyl-reactive groups is one or more of hexamethylolmelamine (HMM) and hexakis(methoxymethyl)melamine (HMMM).

12. The seed-oil based reactive diluent of claim 10, wherein the core molecule bearing multiple hydroxyl-reactive groups is one or more of hexamethylene diisocyanate, trimers of hexamethylene diisocyanate and trimers of isophorone diisocyanate.

13. The seed-oil based reactive diluent of claim 10 wherein the core molecule bearing multiple hydroxyl-reactive groups is one or more of terephthalic acid and trimesic acid.

14. The seed-oil based reactive diluent of claim 10, wherein the core molecule bearing multiple hydroxyl-reactive groups can be selected from one or more of maleic anhydride and phthalic anhydride.

15. The seed-oil based reactive diluent of claim 1, wherein the polyol is a molecule with at least two hydroxyl groups.

16. The seed-oil based reactive diluent of claim 15 wherein the polyol is one or more of ethylene glycerol, glycerol and pentaerythitol.

17. The seed-oil based reactive diluent of claim 1 wherein the intermediate reaction mixture includes fatty acid amides and diglycerides.

18. The seed-oil based reactive diluent of claim 1 wherein the molar ratio of mono-hydroxy functional amine to the unsaturated seed oil ranges from 0.5:1.0 to 1.0:0.5 in the aminolysis reaction.

19. The seed-oil based reactive diluent of claim 1 wherein the molar ratio of mono-hydroxy functional amine to unsaturated seed oil is at about 1:1 in the aminolysis reaction.

20. A solvent-borne air-drying alkyd wood stain including a reactive diluent of claim 1.

21. A composition comprising a pigment and a reactive diluent of claim 1.

22. The composition of claim 21 wherein the reactive diluent is present in the pigment in an amount greater than 30 wt %.

23. A reactive diluent comprising the reaction product of mono-hydroxy functional seed oil derivatives, core molecules and polyols wherein each reactive diluent molecule has n fatty acid side chains wherein n is an integer of from 4 to 15, the reactive diluent having a star-branched shape.

24. The reactive diluent of claim 23 including wherein the reactive diluent includes a plurality of reactive diluent molecules and wherein average number of fatty acid side chains in the reactive diluent ranges from about 5 to about 15.

25. The reactive diluent of claim 23 having a weight average molecular weight ranging from 3000 to 4500.

* * * * *